April 26, 1955  E. LAMMERZ ET AL  2,706,952
RAIL VEHICLE WITH INDIVIDUAL AXLE DRIVE
Filed Oct. 4, 1950
3 Sheets-Sheet 2
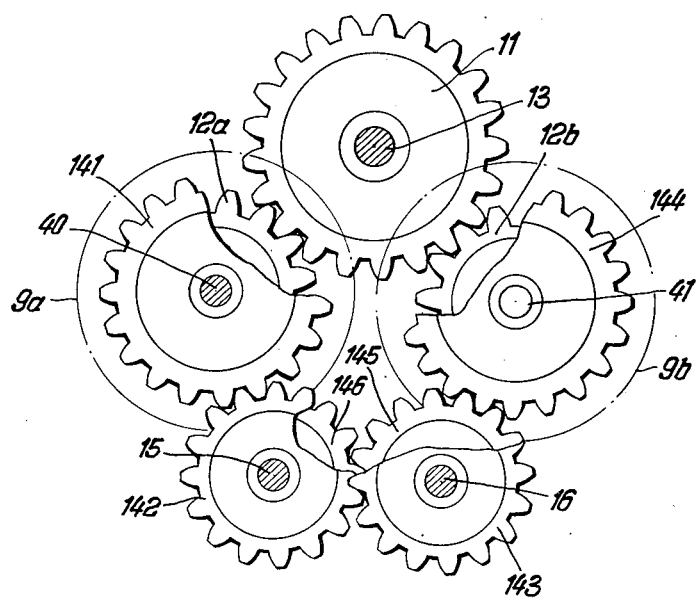
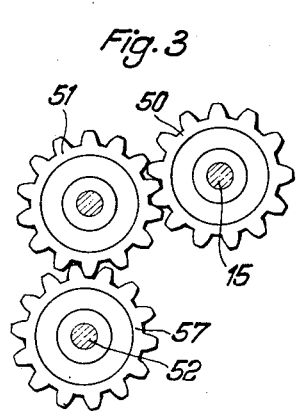
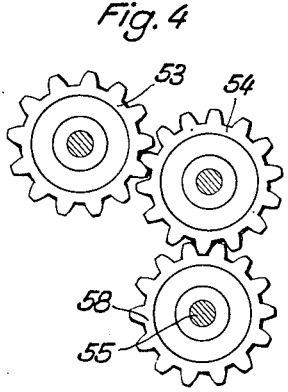
Inventors
ERNST LAMMERZ
HEINRICH HERRMANN
GÜNTHER WEISSIG
BY
ATTORNEYS

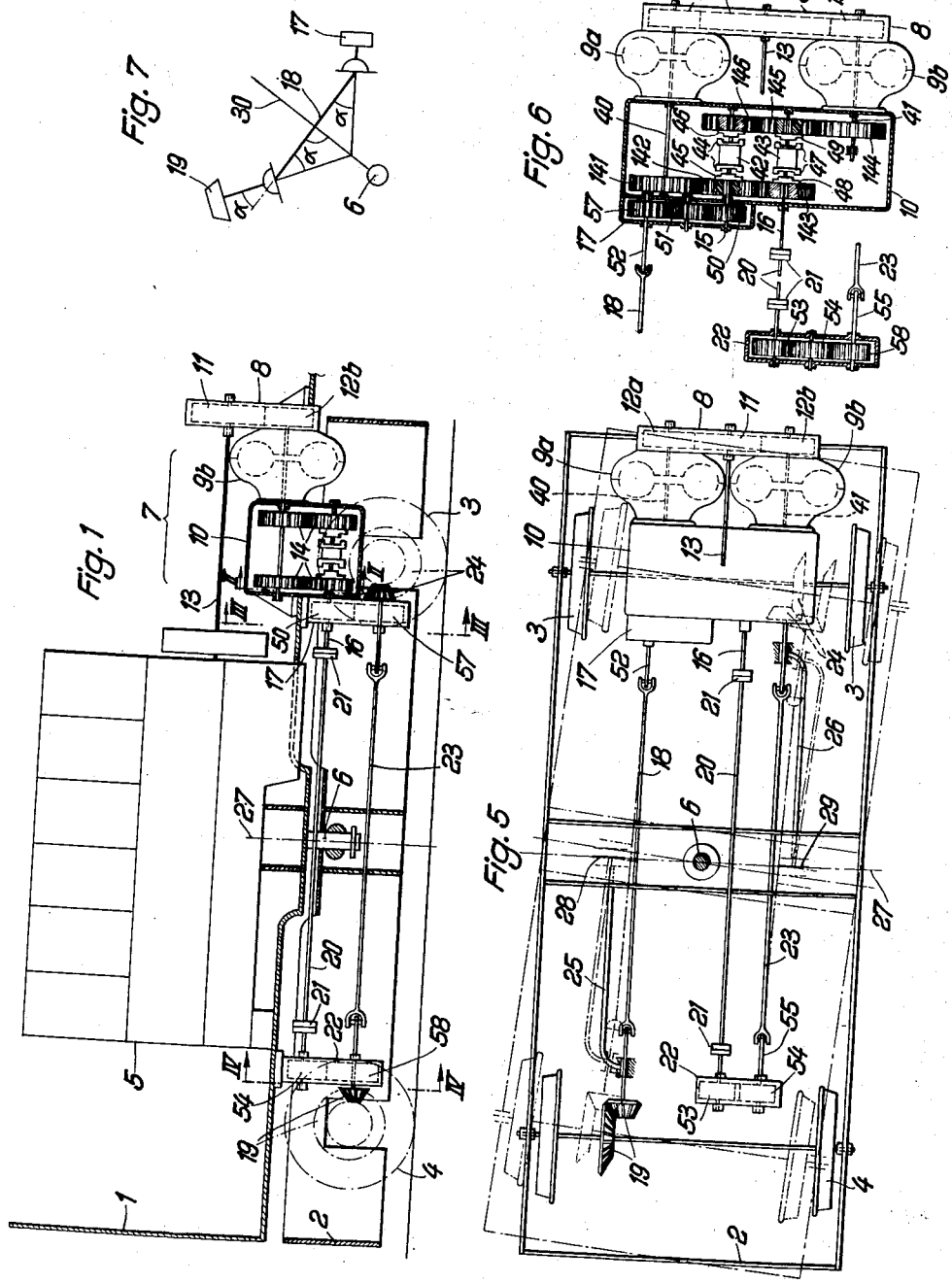

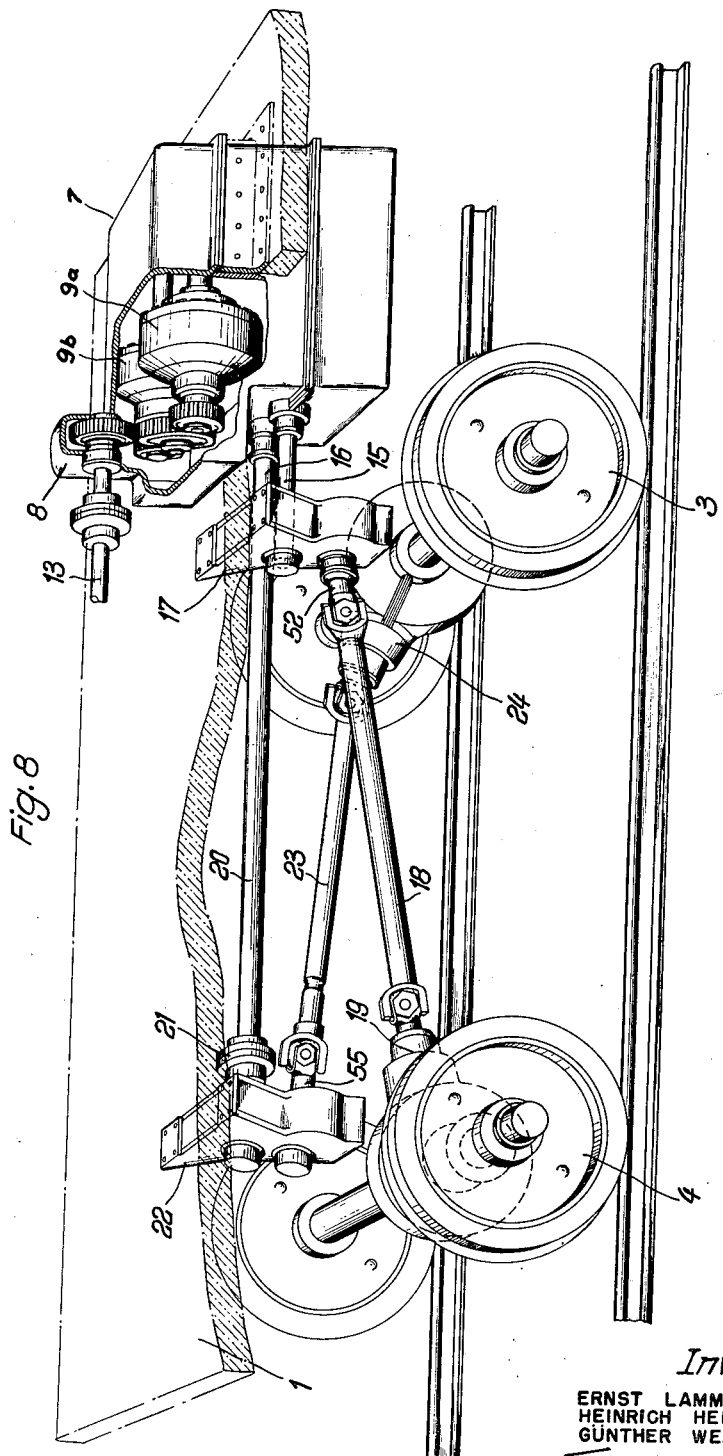

United States Patent Office 2,706,952
Patented Apr. 26, 1955

2,706,952

RAIL VEHICLE WITH INDIVIDUAL AXLE DRIVE

Ernst Lammerz, Essen, Heinrich Herrmann, Kettwig, and Günther Weissig, Munich, Germany, assignors to Fried. Krupp Lokomotivfabrik, Essen, Germany Application October 4, 1950, Serial No. 188,368

Claims priority, application Germany October 10, 1949

6 Claims. (Cl. 105—117)

The present invention pertains to a rail traveling, power propelled vehicle with driving bogie trucks, in which the prime mover resting on the vehicle's main framework drives the wheel sets over transmission gearing effecting the greatest part of the gear ratio, and Cardan drive shafts each with two joints of which the one is connected with a shaft stub located on the main framework and the other with a shaft stub on the bogie truck, and in which the wheel sets are driven separately, especially bogie-truck diesel locomotives.

Rail vehicles equipped with railway trucks have the favorable characteristics that generally, when passing through curves, no difficulties are encountered, and that their good driving features are maintained even at high speeds. This is of particular importance in connection with narrow gauges.

When a vehicle with railway trucks is used as a railway motor car, the arrangement is usually such that the engine, for instance the diesel engine, is mounted on one half of the railway truck, while the power or main transmission is mounted on the other half of the truck. The main transmission usually consists of a fluid drive preceded and followed by a mechanical gear system. The main transmission conveys the driving power to the wheel sets by longitudinally extending drive shafts provided with two joints.

Due to the size of the engine employed or the conditions prevailing while driving through a curve, in locomotives with railway trucks, there is frequently not sufficient space in the truck for both the main transmission and the engine. It is rather necessary to mount at least one of them in the vehicle frame which may be termed the main frame. When employing an electric power transmission, it is relatively simple in such instance to convey the power from the main frame to the wheel sets of the railway truck. However, the situation is fundamentally different when the power is to be transmitted by mechanical or fluid drives.

Therefore, it is an object of the present invention to provide a rail vehicle with railway trucks having individual axle drive, in which the power transmission includes mechanical means such as drive shafts, without in any way complicating the entire structure.

It is another object of this invention to provide a rail vehicle construction including railway truck means and driving shaft means for conveying the driving power from the engine to the wheel sets, in which the driving shaft means and the engine are distributed over the truck frame and the main frame of the vehicle and connected thereto in such a manner that a simple construction and a reliable power transmission will be obtained without in any way impairing the free maneuvering of the wheel sets.

These and other objects and advantages of the invention will appear more clearly from the following specification in connection with the accompanying drawings in which:

Figure 1 shows the left half of a rail vehicle truck and frame of a locomotive representing a first embodiment of the present invention.

Figure 2 is a section along the line II—II of Figure 1.

Figure 3 is a section along the line III—III of Figure 1.

Figure 4 is a section along the line IV—IV of Figure 1.

Figure 5 is a top plan view of Figure 1 with the driving engine omitted.

Figure 6 is a plan view of the details of the secondary gear train.

Figure 7 is a diagram illustrating in a somewhat exaggerated manner the change in the position of a drive shaft when the vehicle truck passes around a curve.

Figure 8 is a perspective view of a modification of the invention.

General arrangement

As stated above, the present invention concerns a rail vehicle with railway trucks, individual axle drive, and drive shafts as power conveying means. According to the present invention two wheel sets of the driving bogie truck at least are drivable; for each wheel set to be driven a separate drive located in the vehicle's main framework is provided, and each of the Cardan drive shafts which effect the transmission between the parts of the transmission gear located in the vehicle's frame and in the driving bogie truck is so arranged that its fulcrum or pivotal points lie on both sides of the bogie truck's turning pin or pivot.

Structural arrangement

Referring now to the drawings in detail and, Figures 1 to 5 thereof in particular, the structure shown therein comprises the vehicle or main frame 1 which rests on two vehicle trucks 2 (only one being shown). Each truck has two wheel sets 3, 4 adapted to be driven individually. Mounted in the main frame 1, in the space provided above the pivot 6 of the vehicle truck, is a diesel engine 5 extending in the longitudinal direction of the vehicle.

Above the wheel set 3, shown at the right-hand side in Figures 1 and 3, is the main transmission 7 which transmits the greatest part of the power to be transmitted. The main transmission 7 is likewise connected to the main frame 1. The main transmission 7 consists of a primary gear train 8, two fluid drives 9a, 9b, and a mechanical secondary gear train 10. The primary gear train 8 is formed by a gear 11 which is mounted at the free end of an extension 13 of the motor shaft, and two gears 12a, 12b arranged side by side both constantly meshing with gear 11. The secondary gear train 10 makes it possible that each fluid drive 9a, 9b individually drives one wheel set 3 and 4 respectively and that, when reversing the driving direction, the driving connection of the fluid drives with the wheel sets 3, 4 is exchanged. The wheel sets 3 and 4 are journalled in the vehicle truck frame 2 so as to be yieldable upwardly and downwardly. The wheel sets 3 and 4 are adapted, together with the truck frame 2, to turn about the pivot 6.

The fluid drive 9a which, in Figure 5, is shown as the upper fluid drive, drives the wheel set 4 remote therefrom, whereas the lower fluid drive 9b drives the wheel set 3 adjacent thereto. To this end, two transmission shafts 15, 16 extend from the secondary transmission 10. The shaft 15, by means of an intermediate transmission 17 associated with the main transmission 7, drives the wheel set 4 through a Cardan drive shaft 18 and a bevel gear transmission 19 (axle transmission). The Cardan shaft 18 extends in the longitudinal direction of the vehicle and is provided with two joints, while the axle transmission 19 is associated with the axle shaft of the wheel set 4.

The other shaft 16 conveys its rotation, first by means of an extension shaft 20 and clutches 21 to the second intermediate transmission 22 associated near the other end of the vehicle truck. The transmission 22 is likewise carried by the main frame. Extending from the intermediate transmission 22 is a Cardan drive shaft 23 provided with two joints and leading to a bevel gear transmission 24 (axle transmission) associated with the axle of the wheel set 3.

In Figure 6 is shown a plan view of the gearing 10 with the housing cover taken off, in which the gear wheels are presented spread out in one plane.

On the turbine shaft 40 of the fluid drive gear 9a is keyed the gear 141, which is constantly in mesh with the gear 142. The gear 142 is again continually in mesh with the gear 143. The gear 142 is loosely revolvable on the shaft 15; the gear 143 is loosely revolvable on the shaft 16.

On the turbine shaft 41 of the fluid drive gearing 9b is keyed the gear 144, which is constantly in mesh with the gear 145. The gear 145 remains constantly in mesh with the gear 146. The gear 145 is loosely revolvable on the shaft 16; the gear 146 is loosely revolvable on the shaft 15.

Between the gears 142 and 146 on shaft 15, axially shiftable thereon but nonrevolvable thereon, is the gearshift sleeve 42. Likewise, between the gears 143 and 145, axially shiftable on shaft 16, but nonrevolvable thereon, there is the gear sleeve 43. The gear sleeve 42 carries on both sides the shift dogs 44, which can be brought into engagement through a shifting of the gear sleeve with the shift dogs 45 of the gear 142 or with the shift dogs 46 of the gear 146. Likewise, the gearshift sleeve 43 carries shift dogs 47 on both sides, which, through a shifting of the gearshift sleeve, can be brought into engagement with the shift dogs 48 of the gear 143 or with the shift dogs 49 of the gear 145.

The gear 50 is fixed on shaft 15 and is constantly in mesh with the gear 51, which in turn constantly meshes with the gear 57 arranged below the gear 51. The gear 57 is fixed on shaft 52, to which the Cardan drive shaft 18 is articulated or hinged. In the one traveling direction the dogs 44 of the gearshift sleeve 42 are in engagement with the dogs 45 of the gear 142, and simultaneously, the dogs 47 of the gearshift sleeve 43 are in engagement with the dogs 49 of the gear 145. Then the fluid drive gearing 9a drives by means of shaft 40 the gears 141, 142, the shaft 15, the gears 50, 51, 57, the shaft 52, and therewith the Cardan drive shaft 18. Simultaneously, the fluid drive gearing 9b drives by means of shaft 41 the gears 144, 145, the shaft 16.

In the other traveling direction, the dogs 44 of the gearshift sleeve 42 are in engagement with the dogs 46 of the gear 146, and simultaneously, the dogs 47 of the gearshift sleeve 43 are in gear or mesh with the dogs 48 of the gear 143. Then the fluid drive gear 9b drives the shaft 52 by means of shaft 41, the gears 144, 145, 146, the shaft 15, the gears 50, 51, 57, and therewith the Cardan drive shaft 18. Simultaneously, the fluid drive gearing 9a drives the shaft 16 by means of shaft 40, the gears 141, 142, 143. The Cardan drive shaft 18 drives the wheel set 4 by means of the bevel gear 19. The shaft 16 drives the shaft 20 by means of the coupling 21; and shaft 20 drives the intermediate gearing 22 by means of a further coupling 21. The intermediate gearing 22 is arranged symmetrically to the gearing 17 with regard to the axis of the pivot 6. It contains the two gears 53, 54, which are constantly in mesh. The gear 54 meshes constantly with gear 58. The Cardan drive shaft 23 is fulcrumed or hinged to the shaft 55 of the gear 58, which Cardan shaft drives the wheel set 3 by means of the bevel gear 24.

The longitudinally extending driving shafts 18 and 23 are, as shown in the drawing, spaced from the pivot 6, while its joints are evenly spaced therefrom. The mentioned distance is possibly to be held small according to the present invention so that the turning movement will be conveyed to the axles 3 and 4 in a practically even manner. The axle drives 19 and 24 are supported by supporting brackets 25, 26 connected with the truck 2 by joints 28, 29 arranged in the middle transverse plane 27 of the pivot 6. The position of the parts as occupied when the vehicle is driving through a curve, is represented in Figure 5 by dot-dash lines.

As will be obvious from the drawing, the diesel engine 5, the main transmission 7, the intermediate transmissions 17 and 22 and the shaft 20 have maintained their positions unchanged. On the other hand, however, the wheel sets 3 and 4, together with the axle gears 19, 24 turn about the pivot 6. Those joints of the drive shafts 18 and 23, which are connected to the intermediate transmissions 17, 22, maintain their position, whereas those joints provided at the other shaft end turn together with the truck frame. The change in the position of the drive shaft 8 is shown grossly exaggerated in Figure 7. As will be seen from Figure 7, the drive shaft 18 has been rotated by an angle α relative to the short shaft leading to the intermediate transmission 17. During this rotative movement, the short shaft leading to the axle transmission 19, has rotated relative to the drive shaft 18 by the same angle α, while the vertical center line 30, forming an angle of 90° with the drive shaft 18, passes through the geometric axis of the pivot 6. In these circumstances, the uneven turning movement brought about by the drive shaft 18 is compensated again. The above remarks also apply to the drive shaft 23 in a corresponding manner.

Referring now to another embodiment of the invention as illustrated in Figure 8, the structure shown therein is again related to the arrangement of Figure 1. It differs from that of Figure 1 merely in that the intermediate transmissions 17 and 22 do not consist of spur gears mounted one beneath the other, but consist of slightly inclined bevel gear pairs. The short shafts 52 and 55 associated with the drive shafts 18 and 23 and leading to the axle transmissions 19 and 24 then have the same inclination as the axis of the inclined bevel gears. In this way, it has been made possible that the intermediate transmission 17 for the left wheel set 4 and the axle transmission 24 of the right wheel set 3 are arranged relative to each other in such a manner that both transmissions 17 and 24, in spite of a short truck, may at all times and at all sides freely pass each other. This feature is of particular importance in connection with the application of narrow gauges and narrow trucks.

This embodiment may be changed without difficulty in such a manner that the main transmission 7 is located in the area of the center of the truck, while the motor 5 is mounted in the area at the end of the truck.

It is, of course, understood that the constructions according to the present invention illustrated in Figures 1 to 8 need not necessarily form the left part of the vehicle, but may instead form the right half of the vehicle so that the main transmissions 7, instead of being mounted at the center portion of the vehicle, will be located at the ends of the vehicle. Instead of diesel engines 5, any other convenient type of engines or motors may be provided. Furthermore, the fluid drives 9a, 9b may be replaced by a mechanical differential drive which will allow the independent drive of the two axles 3, 4.

It is, furthermore, understood that the present invention is by no means limited to the particular construction and arrangement shown in the drawings but, also, comprises any modifications within the scope of the apppended claims. Thus, it is by no means necessary to arrange the primary transmission 8 and secondary transmission 10 in the specific way shown in the drawings. It is merely necessary that the main transmission 7 is provided with two output shafts 15, 16 which will make possible the individual or independent drive of the two wheel axles.

What we claim is:

1. In a power-propelled rail vehicle, in combination; a main frame; a driving bogie truck; a pivotal connection between said main frame and said driving bogie truck; a pair of individually driven wheel sets with axles journalled in said bogie truck on opposite sides of said pivotal connection; driving means mounted on said main frame and comprising a prime mover and a power dividing main transmission gearing; an auxiliary gear transmission for each of said individually driven wheel sets, said auxiliary gear transmissions being carried by said main frame on respectively opposite sides of said pivotal connection and each being located near the wheel set other than the one it drives, driving shafts connecting said auxiliary gear transmissions with said main transmission gearing; and Cardan shafts extending longitudinally from said auxiliary gear transmissions to and geared to the respective wheel sets most remote from the auxiliary gear transmission.

2. An arrangement according to claim 1 wherein the joints in each of the Cardan shafts are substantially equally spaced from the axis of said pivotal connection between the truck and the main frame.

3. An arrangement according to claim 1 in which the driving means includes a diesel engine, two fluid drives conveying power from said engine, said fluid drives being arranged side by side, and a reversing gearing drivingly connected to said two fluid drives.

4. An arrangement as set forth in claim 3 in which said reversing gearing is located near one of said auxiliary gear transmissions so that said reversing and said auxiliary gearing are connected by a short shaft stub.

5. An arrangement according to claim 1 in which the axes of said Cardan shafts are inclined and with substantially the same inclination with regard to the horizontal.

6. An arrangement as set forth in claim 5 in which each of said auxiliary gear transmissions includes bevel gears inclined relative to each other.

(References on following page)

References Cited in the file of this patent

UNITED STATES PATENTS

| Number | Name | Date |
|---|---|---|
| 1,203,741 | Howie | Nov. 7, 1916 |
| 1,411,363 | Lieberman | Apr. 4, 1922 |
| 1,544,574 | Guernsey | July 7, 1925 |
| 2,106,843 | Hahn | Feb. 1, 1938 |
| 2,272,679 | Ostermann | Feb. 10, 1942 |
| 2,355,409 | Anderson | Aug. 8, 1944 |
| 2,575,242 | Allen | Nov. 13, 1951 |

FOREIGN PATENTS

| Number | Country | Date |
|---|---|---|
| 337,083 | Italy | Feb. 26, 1936 |